(12) United States Patent
Izawa et al.

(10) Patent No.: US 7,112,959 B2
(45) Date of Patent: Sep. 26, 2006

(54) COMPARATOR CIRCUIT AND ROTATION DETECTOR

(75) Inventors: Ichiro Izawa, Okazaki (JP); Hiroshi Okada, Aichi-ken (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/213,763

(22) Filed: Aug. 30, 2005

(65) Prior Publication Data

US 2006/0043966 A1 Mar. 2, 2006

(30) Foreign Application Priority Data

Aug. 30, 2004 (JP) ............................ 2004-250518

(51) Int. Cl.
*G01B 7/30* (2006.01)
*H03D 13/00* (2006.01)
(52) U.S. Cl. .................................. 324/207.25; 327/40

(58) Field of Classification Search ........... 324/207.25; 327/40
See application file for complete search history.

(56) References Cited

U.S. PATENT DOCUMENTS 6,104,186 A 8/2000 Yamada et al.

FOREIGN PATENT DOCUMENTS

JP 10-293044 11/1998

*Primary Examiner*—Bot LeDynh
(74) *Attorney, Agent, or Firm*—Posz Law Group, PLC

(57) ABSTRACT

The comparator circuit includes an amplifier amplifying a voltage signal inputted from outside, a voltage dividing circuit dividing down a power supply voltage supplied from outside, thereby producing a reference voltage, a waveform dull circuit dulling the reference voltage, and a comparator comparing a voltage of the input voltage signal amplified by the amplifier with the reference voltage dulled by the waveform dull circuit.

7 Claims, 4 Drawing Sheets

PRIOR ART

US 7,112,959 B2

COMPARATOR CIRCUIT AND ROTATION DETECTOR

CROSS-REFERENCE TO RELATED APPLICATION

This application is related to Japanese Patent Application No. 2004-250518 filed on Aug. 30, 2004, the contents of which are hereby incorporated by reference.

BACKGROUND OF THE INVENTION

1. Field of the Invention

The present invention relates to a comparator circuit.

2. Description of Related Art

Generally, a vehicle-installed rotation detector used as a crank angle sensor, a cam angle sensor, a wheel speed sensor and the likes is configured to detect rotation of a detecting gear on the basis of changes of the direction of a magnetic flux flowing between the detecting gear and a bias magnet by use of magneto resistive elements utilizing the fact that the direction of the magnetic flux when the bias magnet faces one of the tooth roots of the detecting gear is different from that when the bias magnet faces one of the tooth peaks of the detecting gear.

Such a rotation detector has a comparator circuit as shown in FIG. 3. In this drawing, an input voltage signal supplied from the side of magneto resistive elements (not shown) is amplified by an operational amplifier OP, and then applied to a signal input terminal Cs of a comparator CP. On the other hand, a reference voltage input terminal Cr of the comparator CP is applied with a reference voltage produced by dividing down a power supply voltage Vc by a first voltage dividing resistor R1 and a second voltage dividing resistor R2. The comparator CP outputs a high-level signal when the voltage of the amplified input voltage signal is lower than the reference voltage. Such a comparator circuit is disclosed in Japanese Patent Application Laid-open No. 10-293044, for example.

However, the above described comparator circuit has a problem in that it tends to erroneously output a pulse-like signal when it is used in a vehicle, because large noise emitted from a high-tension code supplying a high-tension voltage to a spark plug easily enters a power line connected to a vehicle battery.

Furthermore, the above described comparator circuit can erroneously output a pulse-like signal also when several of turn-on timings of large-power consuming units such as headlights, an air conditioner, and a power steering unit overlap, and thereby the voltage of the power line momentarily drops greatly because of control delay of a vehicle generator.

Explanation as to how the comparator circuit outputs a false pulse is made below with reference to FIG. 4A.

Assume a case where the power supply voltage (the voltage of the power line) falls from 5V to 1V at time t1, and subsequently rises from 1V at time t2 as shown in (A) in FIG. 4A. In this case, as shown in (B) in FIG. 4A, each of the reference voltage represented by a broken curve and the voltage of the amplified input voltage signal outputted from the operational amplifier OP represented by a solid curve starts to fall at time t1, and starts to rise at time t2.

However, since the operational amplifier OP includes capacitors therein and accordingly has an integral characteristic, the falling and rising slopes of the voltage of the amplified input voltage signal become gentler than those of the reference voltage. As a result, the voltage of the amplified input voltage signal becomes lower than that of the reference voltage for a certain time period starting from time t2. This causes the comparator CP to output a false pulse at time t3 which is behind time t2 by a certain delay time (19 μs, for example) as shown in (C) in FIG. 4A.

The comparator circuit can output such a false pulse also when the power is turned on as explained below with reference to FIG. 4B. When the power is turned on, and the power supply voltage rises from 0V at time t4 as shown in (A) in FIG. 4B, each of the reference voltage represented by a broken curve and the voltage of the amplified input voltage signal outputted from the operational amplifier OP represented by a solid curve starts to rise from 0V at time t4 as shown in (B) in FIG. 4B.

However, since the operational amplifier OP has integral characteristic as described above, the falling and rising slopes of the voltage of the amplified input voltage signal become gentler than those of the reference voltage. As a result, the voltage of the amplified input voltage signal becomes lower than the reference voltage for a certain time period starting from time t5. This causes the comparator CP to output a false pulse at time t6 which is behind time t5 by a certain delay time (19 μs, for example) as shown in (C) in FIG. 4B. The comparator circuit can output a false pulse also when the power is turned off. Such a false pulse causes reduction of accuracy in detecting the crank angle, cam angle, or wheel rotational speed, for example.

SUMMARY OF THE INVENTION

The present invention provides a comparator circuit including:

an amplifier amplifying a voltage signal inputted from outside;

a voltage dividing circuit dividing down a power supply voltage supplied from outside, thereby producing a reference voltage;

a waveform dull circuit dulling the reference voltage; and a comparator comparing a voltage of the input voltage signal amplified by the amplifier with the reference voltage dulled by the waveform dull circuit.

In the comparator circuit of the invention, although the waveform of the input voltage signal is dulled by the amplifier, the waveform of the reference voltage is also dulled by the waveform dull circuit. Accordingly with the comparator circuit of the invention, it is possible to prevent a false pulse from being outputted from the comparator, when the power supply voltage changes momentarily.

The present invention also provides a rotation detector including a sensor element configured to output a voltage signal changing in amplitude at a frequency corresponding to a rotational speed of a rotating body to be detected by the rotation detector, and a comparator circuit outputting a pulse signal having the frequency corresponding to the rotational speed of the rotating body, the comparator circuit including:

an amplifier amplifying the voltage signal;

a voltage dividing circuit dividing down a power supply voltage supplied from outside, thereby producing a reference voltage;

a waveform dull circuit dulling the reference voltage; and a comparator comparing a voltage of the input voltage signal amplified by the amplifier with the reference voltage dulled by the waveform dull circuit.

With the rotation detector of the invention, it becomes possible to avoid miscounting the rotation of a rotating body (a vehicle wheel, for example), if noise is superimposed to the power supply voltage, or when the power is turned on or off.

BRIEF DESCRIPTION OF THE DRAWINGS

In the accompanying drawings:

FIG. 2B is a diagram showing waveforms of the power supply voltage, amplified input voltage signal, reference voltage, and output signal in the comparator circuit when the power is turned on;

FIG. 4B is a diagram showing waveforms of the power supply voltage, amplified input voltage signal, reference voltage, and output signal in the conventional comparator circuit when the power is turned on.

PREFERRED EMBODIMENTS OF THE INVENTION

Figure 1:
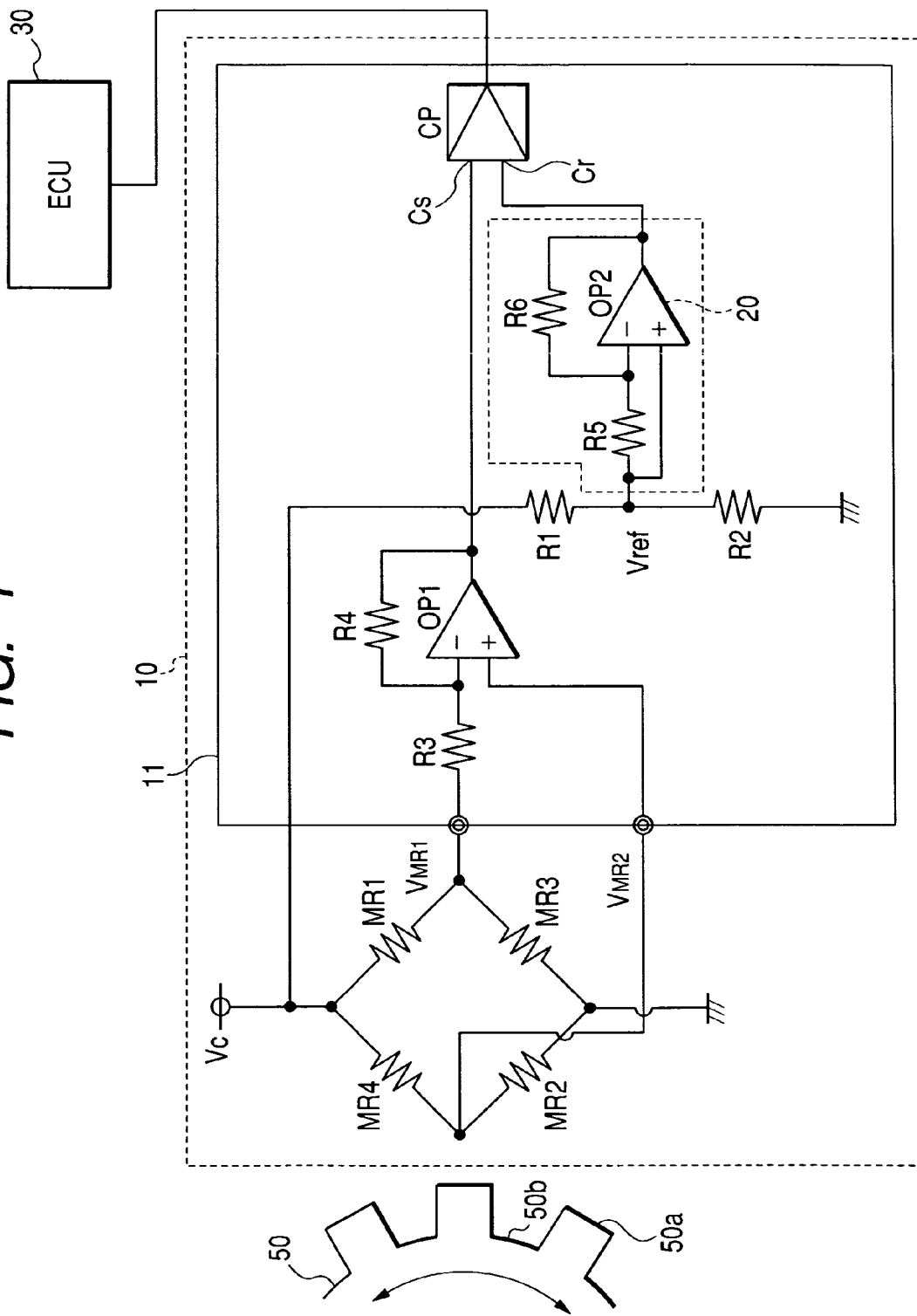
FIG. 1 is a circuit diagram of a rotation detector having a comparator circuit according to an embodiment of the invention.

FIG. 1 shows a circuit diagram of a rotation detector 10 having a comparator circuit 11 according to an embodiment of the invention.

The comparator circuit 11 includes operational amplifiers OP1 and OP2, and a comparator CP. In this figure, reference numeral 30 denotes an ECU (Engine control Unit) 30 for use in ABS (Antilock Brake System), or VSC (Vehicle Stability Control system). The ECU 30 obtains a wheel rotational speed on the basis of the output of the rotation detector 10.

The gear 50 is made of magnetic material, and has tooth peaks 50a and tooth roots 50b formed with a certain pitch. The gear 50 is configured to rotate in one with a vehicle tire (not shown). The gear 50 is applied with a magnetic field by a bias magnet (not shown).

The ECU 30 supplies the rotation detector 10 with the power supply voltage Vc. The rotation detector 10 detects the rotational speed (angular velocity) of the gear 50 on the basis of changes of the direction of the magnetic field between the gear 50 and the bias magnet by use of magneto resistive elements MR1, MR2, MR3, MR4 utilizing the fact that the direction of the magnetic field when the bias magnet faces one of the tooth peaks 50a is different from that when the bias magnet faces one of the tooth roots 50b.

The magneto resistive elements MR1, MR2, MR3, MR4 are bridge-connected. The node of the magneto resistive elements MR1 and MR4 is connected to the power voltage Vc, and the node of the magneto resistive elements MR2 and MR3 is connected to the ground. The voltage at the node of the magneto resistive elements MR1 and MR3 is applied, as a first node voltage VMR1 to the inverted input terminal of the operational amplifier OP1 through a resistor R3. The voltage at the node of the magneto resistive elements MR2 and MR4 is applied, as a second node voltage VMR2, directly to the non-inverted input terminal of the operational amplifier OP1.

The output terminal and the inverting input terminal of the operational amplifier OP1 are connected to each other through a resistor R4. The operational amplifier OP1 amplifies the difference between the voltage applied to its inverting input terminal and its non-inverting input terminal by a certain amplification factor, and applies it to the signal input terminal Cs of the comparator CP.

The power supply voltage Vc is divided down by a voltage-dividing circuit constituted by a first voltage-dividing resistor R1 and a second voltage-dividing resistor R2 connected in series between the power supply voltage Vc and a ground voltage, thereby producing a reference voltage Vref at a node of these resistors R1, R2. The reference voltage Vref is applied to the reference voltage input terminal Cr of the comparator CP through a waveform-dulling circuit 20 constituted by an operational amplifier OP2, a resistor R5, and a resistor R6.

The non-inverting input terminal of the operational amplifier OP2 is directly connected to the node of the first and second voltage-dividing resistors R1, R2. On the other hand, the inverting input terminal of the operational amplifier OP2 is connected to this node through the resistor R5. The non-inverting input terminal and the output terminal of the operational amplifier OP2 is connected to each other through the resistor R6. Since both the non-inverting and the inverting input terminals of the operational amplifier OP2 are connected to the same node, the gain of the waveform-dulling circuit 20 is one.

Accordingly, the voltage at the output terminal of the operational amplifier OP2 is equal to the reference voltage Vref in a non-transient state. However, when the reference voltage Vref changes, the voltage at the output terminal of the operational amplifier OP2 only gradually follows the reference voltage Vref, because the operational amplifier OP2 includes capacitors therein and accordingly has an integral characteristic.

Incidentally, if the non-inverting and the inverting terminals of the operational amplifier OP2 are permuted with each other, the same effect can be obtained.

When the gear 50 rotates, the resistances of the magneto resistive elements MR1, MR2, MR3, and MR4 change periodically at a frequency corresponding to the rotational speed of the gear 50, and accordingly, the difference between the first and the second node voltages VMR1, VMR2 changes in amplitude periodically at the frequency corresponding to the rotational speed of the gear 50. This periodically changing voltage difference is amplified by the operational amplifier OP1, and is compared with the reference voltage Vref in the comparator CP. Since the comparator CP outputs a high level signal while the voltage applied to its signal input terminal Cs is lower than the reference voltage Vref applied to its reference voltage input terminal Cr, pulse signals are outputted from the comparator CP in synchronization with the rotation of the gear 50.

Next, the operation of the rotation detector circuit 10 is explained below with reference to FIGS. 2A.

Figure 2A:
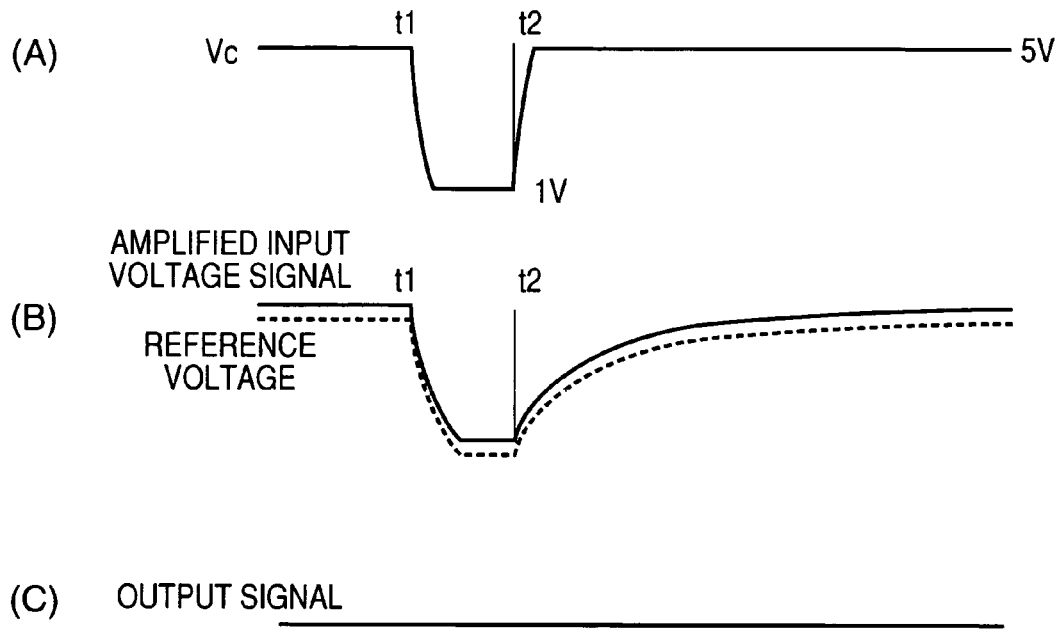
FIG. 2A is a diagram showing waveforms of a power supply voltage, an amplified input voltage signal, a reference voltage, and an output signal in the comparator circuit when the power supply voltage momentarily drops.

FIG. 2A shows a case where the power supply voltage Vc drops momentarily under the influence of the noise emitted from a high tension code supplying a high voltage to a spark plug. Such a momentary voltage drop can occur also when several of turn-on timings of large-power consuming units such as headlights, an air conditioner, and a power steering unit overlap, if there is a control delay of an vehicle generator at this moment.

Figure 3:
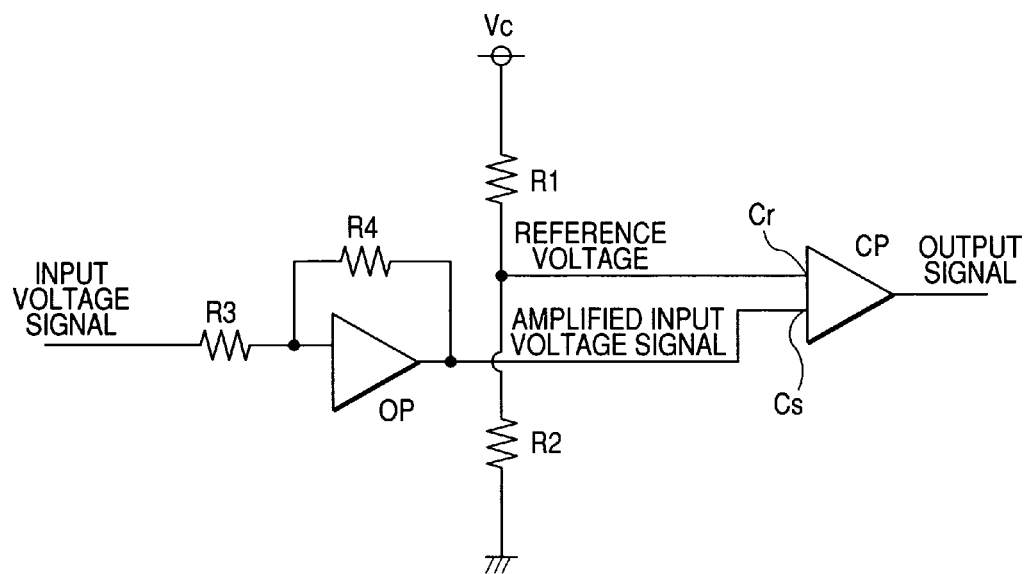
FIG. 3 is a circuit diagram of a conventional comparator circuit.
Figure 4A:
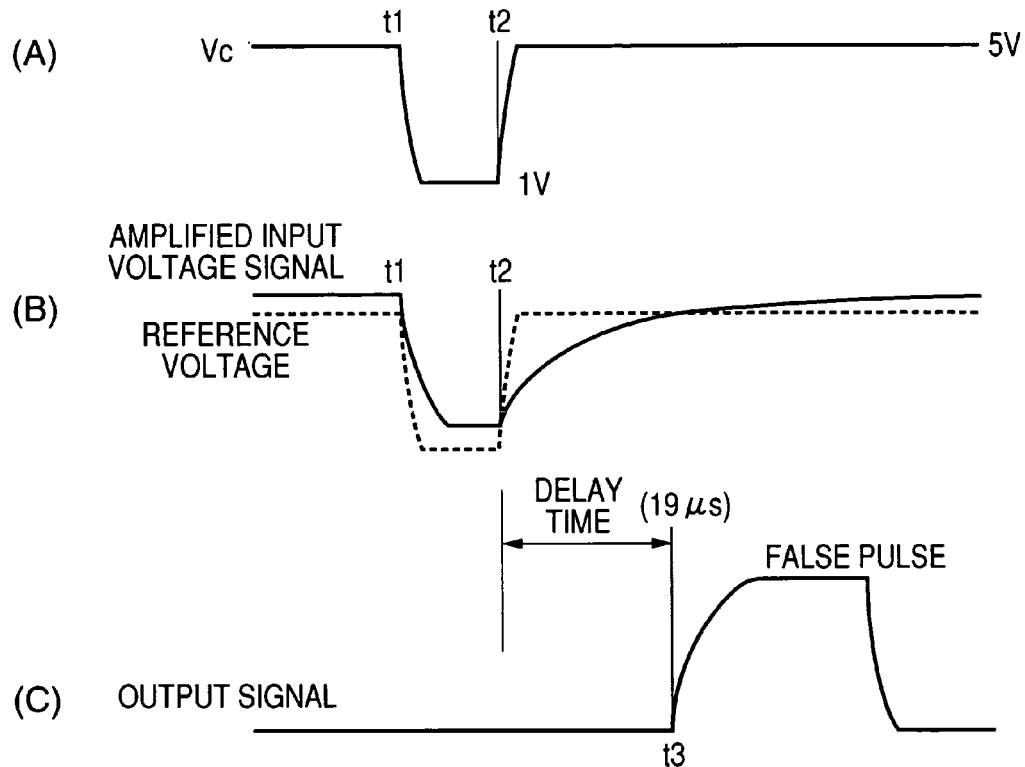
FIG. 4A is a diagram showing waveforms of a power supply voltage, an amplified input voltage signal, a reference voltage, and an output signal in the conventional comparator circuit when the power supply voltage momentarily drops.
Figure 4B:
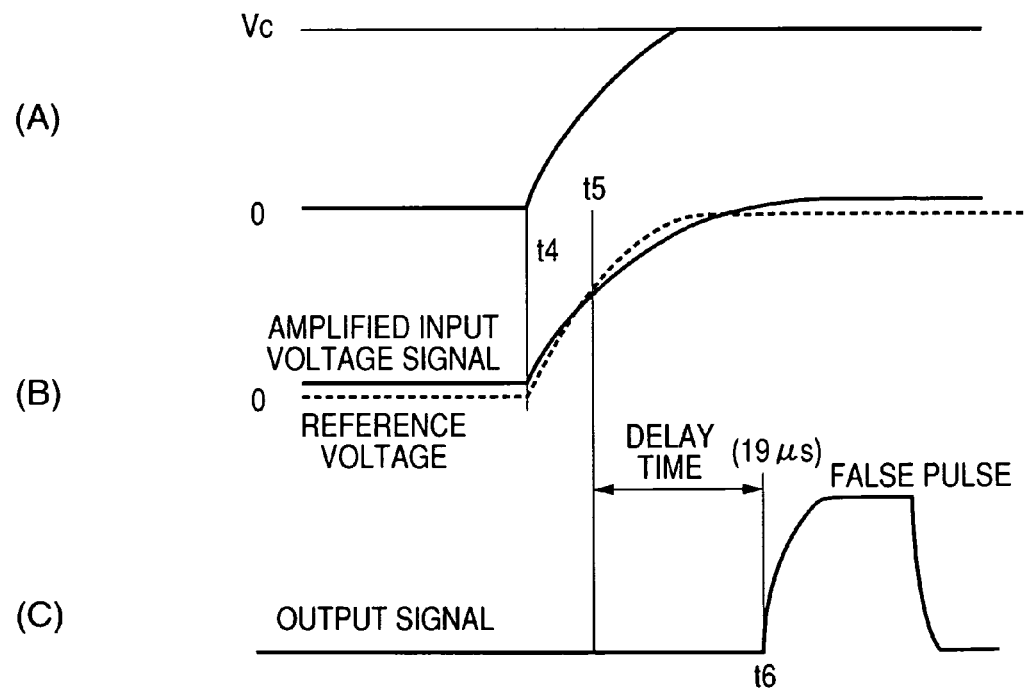

When the power supply voltage Vc falls from 5V to 1V at time t1, and subsequently rises to 5V at time t2 as shown in (A) in FIG. 2A, each of the reference voltage Vref represented by a broken curve and the amplified input voltage outputted from the operational amplifier OP represented by a solid curve starts to fall at time t1, and starts to rise at time t2 as shown in (B) in FIG. 2A. As in the case of the conventional comparator circuit explained with reference to FIGS. 3, 4A, and 4B, since the operational amplifier OP1 includes capacitors therein and accordingly has an integral characteristic, the rising and falling slopes of the amplified input voltage become gentle. However, in this embodiment, unlike the conventional comparator circuit, the rising and falling slopes of the reference voltage Vref represented by a solid curve also become gentle as shown in (B) in FIG. 2B, because the reference voltage Vref passes through the operational amplifier OP2 which includes capacitors therein and accordingly has an integral characteristic.

Accordingly, in this embodiment, the comparator CP does not output a false pulse when the power supply voltage Vc drops momentarily, because the voltage of the amplified input voltage applied to the terminal Cs of the comparator CP does not fall below the reference voltage Vref applied to the other terminal Cr of the comparator CP when the power supply voltage Vc drops momentarily.

In this embodiment, the comparator CP does not output a false pulse also when the power is turned on (or turned off) as explained below with reference to FIG. 2B.

Figure 2B:
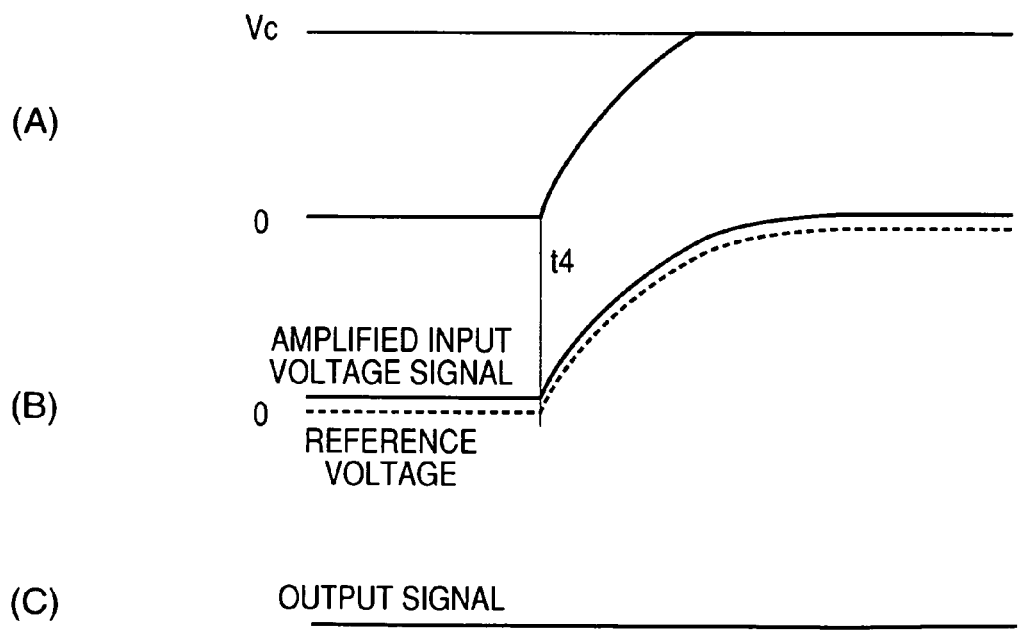

When the power is turned on, and accordingly, the power supply voltage Vc rises from 0V at time t4 as shown in (A) in FIG. 2B, each of the voltage of the amplified input voltage signal represented by a solid curve outputted from the operational amplifier OP1, and the reference voltage Vref represented by a broken curve outputted from the operational amplifier OP2 starts to rise at time t4.

As in the case of the conventional comparator circuit, since the operational amplifier OP1 has the integral characteristic, the falling and rising slopes of the voltage of the amplified input voltage signal become gentle. However, in this embodiment, unlike the conventional comparator circuit, the falling and rising slopes of the reference voltage Vref also become gentle, because the reference voltage Vref passes through the operational amplifier OP2 having the integral characteristic.

Accordingly, in this embodiment, the comparator CP does not output a false pulse when the power is turned on, because the voltage of the amplified input voltage applied to the terminal Cs of the comparator CP does not fall below the reference voltage applied to the other terminal Cr of the comparator CP when the power is turned on. Although explanation is omitted, the comparator CP in this embodiment does not output a false pulse when the power is turned off as well.

With the rotation detector of this embodiment, it becomes possible to avoid miscounting the rotation of the vehicle wheel when noise is superimposed to the power supply voltage Vc, or when the power is turned on or off.

It is desirable that the operational amplifier OP2 constituting the waveform-dulling circuit 20 has the same amplification characteristic as the operational amplifier OP1 amplifying the input voltage, so that the output waveforms of the operational amplifiers OP1 and OP2 become dull equally when the poser supply voltage Vc changes.

It is also desirable that the resistances of the resistor R6 connecting the inverting input terminal and the output terminal of the operational amplifier OP2, and the resistor R4 connecting the inverting input terminal and the output terminal of the operational amplifier OP1 are in the same order for the same reason.

Although the above described embodiment concerns detecting the rotation of the vehicle wheel, the present invention can be used for various rotation detecting sensors such as a crank angle sensor, and a cam angle sensor.

Furthermore, the present invention can be used for preventing a false pulse from being produced when the power is turned on or off by semiconductor sensors configured to compare an input voltage with a reference voltage and output a pulse signal in accordance with the comparison result.

The above explained preferred embodiments are exemplary of the invention of the present application which is described solely by the claims appended below. It should be understood that modifications of the preferred embodiments may be made as would occur to one of skill in the art.

What is claimed is:

1. A comparator circuit comprising:
   an amplifier amplifying a voltage signal inputted from outside;
   a voltage dividing circuit dividing down a power supply voltage supplied from outside, thereby producing a reference voltage;
   a waveform dull circuit dulling said reference voltage; and
   a comparator comparing a voltage of said input voltage signal amplified by said amplifier with said reference voltage dulled by said waveform dull circuit.

2. The comparator circuit according to claim 1, wherein said voltage dividing circuit includes two voltage dividing resistors connected in series between said power supply voltage and a ground voltage.

3. The comparator circuit according to claim 2, wherein said amplifier is constituted by a first operational amplifier, and said waveform dull circuit is constituted by a second operational amplifier.

4. The comparator circuit according to claim 3, wherein said second operational amplifier has an inverting input terminal, a non-inverting input terminal, and an output terminal, one of said inverting and non-inverting input terminals being connected to a node of said two voltage dividing resistors through a first resistor, the other of said inverting and non-inverting input terminals being directly connected to said node, said output terminal and said one of said inverting and non-inverting input terminals being connected to each other through a second resistor.

5. The comparator circuit according to claim 4, wherein said first operational amplifier has the same amplification characteristic as said second operational amplifier.

6. The comparator circuit according to claim 4, wherein said first operational amplifier has an inverting input terminal, a non-inverting input terminal, and an output terminal, said output terminal of said first operational amplifier and one of said inverting and non-inverting input terminals of said first operational amplifier being connected to each other through a third resistor, said third resistor and said second resistor having the same resistance.

7. A rotation detector including a sensor element configured to output a voltage signal changing in amplitude at a frequency corresponding to a rotational speed of a rotating body to be detected by said rotation detector, and a comparator circuit outputting a pulse signal having said frequency corresponding to said rotational speed of said rotating body, said comparator circuit comprising:
an amplifier amplifying said voltage signal;
a voltage dividing circuit dividing down a power supply voltage supplied from outside, thereby producing a reference voltage;
a waveform dull circuit dulling said reference voltage; and
a comparator comparing a voltage of said input voltage signal amplified by said amplifier with said reference voltage dulled by said waveform dull circuit.

* * * * *